United States Patent
McNeel et al.

(10) Patent No.: US 9,630,847 B2
(45) Date of Patent: Apr. 25, 2017

(54) METHOD AND APPARATUS FOR MONITORING AND CONTROLLING EXOTHERMIC AND ENDOTHERMIC CHEMICAL REACTIONS

(71) Applicant: Buckman Laboratories International, Inc., Memphis, TN (US)

(72) Inventors: Thomas E. McNeel, Memphis, TN (US); Richard A. Clark, Memphis, TN (US); Richard D. Lusk, Jr., Memphis, TN (US)

(73) Assignee: Buckman Laboratories International, Inc., Memphis, TN (US)

(*) Notice: Subject to any disclaimer, the term of this patent is extended or adjusted under 35 U.S.C. 154(b) by 156 days.

(21) Appl. No.: 14/034,581

(22) Filed: Sep. 24, 2013

(65) Prior Publication Data

US 2014/0105808 A1 Apr. 17, 2014

Related U.S. Application Data

(60) Provisional application No. 61/713,189, filed on Oct. 12, 2012.

(51) Int. Cl.
  *C01B 21/09* (2006.01)
  *B01J 14/00* (2006.01)
  *B01J 19/00* (2006.01)

(52) U.S. Cl.
  CPC .......... *C01B 21/091* (2013.01); *B01J 14/00* (2013.01); *B01J 19/0013* (2013.01);
  (Continued)

(58) Field of Classification Search
  CPC .... B01J 19/0006; B01J 19/0013; B01J 14/00; C01B 21/09; C01B 21/091
  See application file for complete search history.

(56) References Cited

U.S. PATENT DOCUMENTS 3,254,952 A * 6/1966 Raleigh et al. ............... 423/413
6,132,628 A * 10/2000 Barak ........................ C02F 1/50
  210/743
(Continued)

FOREIGN PATENT DOCUMENTS

DE 102009042994 A1 9/2009
EP 1919018 A1 5/2008
(Continued)

OTHER PUBLICATIONS

William Luyben, "Control of CSTR Systems," Nov. 2, 2006, Wiley & Sons, pp. 154-196.*
(Continued)

*Primary Examiner* — Anthony J Zimmer
(74) *Attorney, Agent, or Firm* — Kilyk & Bowersox, P.L.L.C.

(57) ABSTRACT

A method of controlling an exothermic or endothermic chemical reaction is provided. The method involves measuring a temperature of a first reactant flowing at a first flow rate, contacting the first reactant with a second reactant flowing at a second flow rate to form a reaction product, measuring the temperature of the reaction product, and determining the temperature difference between the temperature of the first reactant and the temperature of the reaction product. The method can further involve adjusting the flow rate of at least one of the first reactant and the second reactant, or shutting down flow, based on the temperature difference. An apparatus to carry out the method is also provided. The method and apparatus can be useful in controlling many different reactions, including the reaction of sodium hypochlorite and ammonia to form monochloramine.

11 Claims, 6 Drawing Sheets

(52) U.S. Cl.
CPC .................. *B01J 2219/0022* (2013.01); *B01J 2219/00063* (2013.01); *B01J 2219/00164* (2013.01); *B01J 2219/00198* (2013.01); *B01J 2219/00202* (2013.01); *B01J 2219/00213* (2013.01); *B01J 2219/00225* (2013.01); *B01J 2219/00231* (2013.01)

(56) References Cited

U.S. PATENT DOCUMENTS

| | | | |
|---|---|---|---|
| 6,222,071 B1* | 4/2001 | Delalu | C01B 21/091 564/118 |
| 2005/0037302 A1* | 2/2005 | Schonert | 431/11 |
| 2008/0095677 A1* | 4/2008 | McSherry et al. | 422/189 |
| 2009/0314484 A1 | 12/2009 | Barrett et al. | |
| 2012/0021062 A1* | 1/2012 | Gupta et al. | 424/600 |

FOREIGN PATENT DOCUMENTS

| | | |
|---|---|---|
| EP | 2495260 A1 | 9/2012 |
| WO | 03019711 A2 | 3/2003 |

OTHER PUBLICATIONS

EPA Guidance Material, "Chloramines," Apr. 1999, pp. 6-1 to 6-35 available at http://water.epa.gov/lawsregs/rulesregs/sdwa/mdbp/upload/2001_01_12_mdbp_alter_chapt_6.pdf.*

Martyn S. Ray, "Chemical Engineering Design Project: A Case Study Approach, Second Edition," 1998, Overseas Publishers Association, pp. 153-155.*

International Search Report and Written Opinion issued in corresponding International Patent Application No. PCT/US2013/061268 dated Jul. 2, 2014 (11 pages).

* cited by examiner

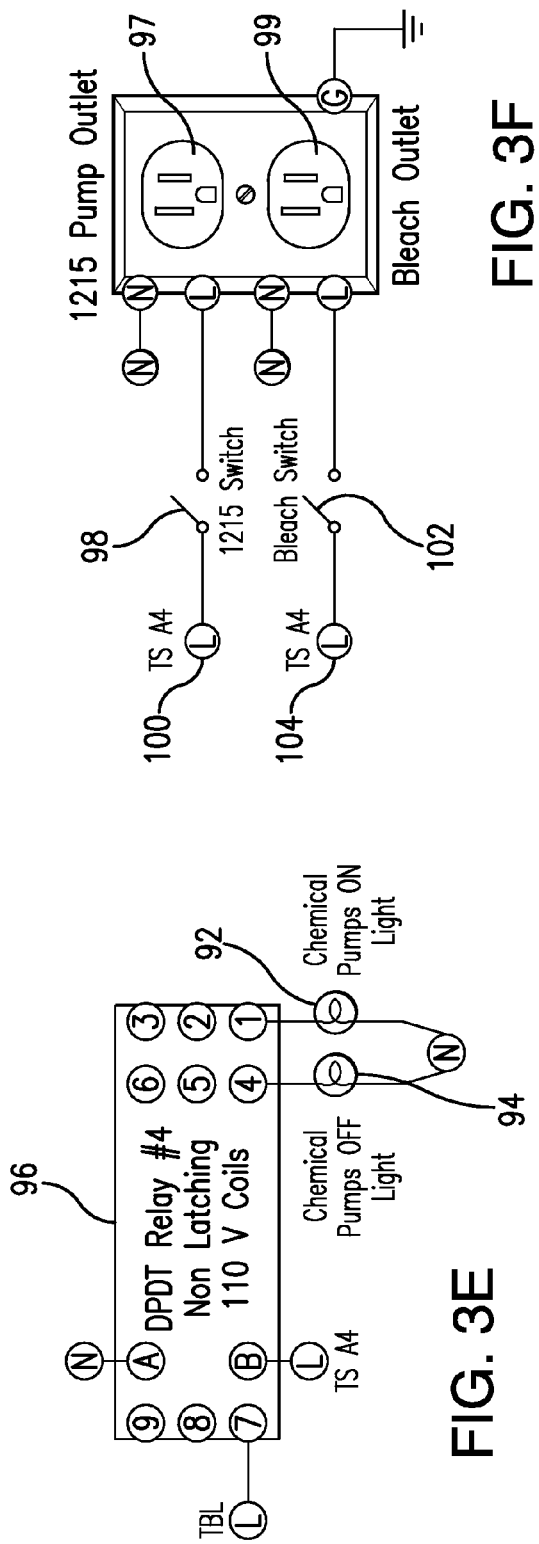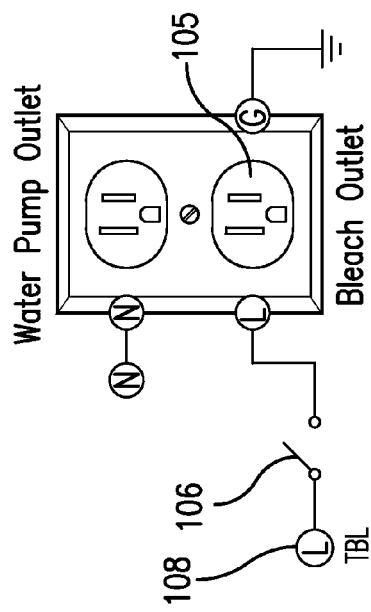
FIG. 3F
FIG. 3G
FIG. 3E

METHOD AND APPARATUS FOR MONITORING AND CONTROLLING EXOTHERMIC AND ENDOTHERMIC CHEMICAL REACTIONS

This application claims the benefit under 35 U.S.C. §119 (e) of prior U.S. Provisional Patent Application No. 61/713,189, filed Oct. 12, 2012, which is incorporated in its entirety by reference herein.

FIELD

The present invention relates generally to the field of monitoring and controlling chemical reactions.

BACKGROUND

Endothermic and exothermic chemical reactions can become violent if reactants are combined in an uncontrolled manner or if the ratio in which the reactants are combined is not correct. Even in the absence of a violent reaction, an incorrect combination of reactants can lead to the formation of unwanted byproducts and a poor yield of a desired product. Safe operation of equipment to run such reactions relies upon an operator to set flow rates in a proper ratio. Unfortunately, the same precision pumps and flow controls that ensure a proper molar ratio of reactants will likewise ensure that the wrong ratio is maintained if incorrect initial settings are used. Such systems have no built-in safeguard to prevent an operator from inadvertently setting up the equipment to make an unsafe combination of reactants. This problem is particularly exemplified by the reaction of bleach and ammonia to produce monochloramine.

The minimum amount of monochloramine that can be produced by commercial generation equipment available today is over one hundred pounds of $NH_2Cl$ per day. While this quantity is appropriate for large-scale industrial applications (paper mills, electric utility generating plants, and the like), there are many smaller-scale applications (reverse-osmosis systems, cooling towers for office buildings, and the like) that require only one-tenth (or less) of the minimum amount that existing commercial units produce. Reducing the size of the equipment is not straightforward, because the safety features of the existing equipment rely upon the use of pumps and flow meters that can reliably deliver precise flow rates. Pumps and flow meters are available that will work with a similar level of precision at these low mL/minute flow rates; however, these devices would be expensive and would tend to be too delicate for typical industrial applications.

Existing techniques for evaluating a bleach:ammonia reaction product involve some sort of chemical analysis of the mixture, usually using on-line or off-line colorimetric measurements. There are drawbacks to the use of these colorimetric techniques. Such measurement techniques take several minutes to complete; and during this time interval, a violent, out-of-control reaction can occur. The use of one or more reagents, which must be replenished periodically, is required. In the on-line measurement equipment, the reagents are fed using peristaltic pumps, which must be serviced periodically. The colorimetric techniques are very sensitive and must be used with very dilute samples at low ppm levels, requiring that a concentrated sample, containing 1% monochloramine or more, would typically have to be diluted by a factor of 100-1000.

SUMMARY

According to the present invention, the deficiencies mentioned above are overcome by a method and apparatus that use temperature differences to monitor and control an exothermic or endothermic chemical reaction. It is an object of the present invention to provide a robust, low-maintenance, low-cost device for monitoring and controlling the combination of two or more chemicals that will undergo an exothermic or endothermic reaction. The present method and apparatus are useful in preventing damage and/or injury that could result from violent, uncontrolled reactions and are also useful in optimizing a combination of reactants used to generate a desired product.

In an exemplary embodiment of the present invention, an electronic device is used to monitor the combination of bleach with an ammonia solution to ensure that the ratio of sodium hypochlorite to ammonia is correct. An increase in the temperature of the reaction mixture beyond that which is expected for the desired reaction can be detected and used to generate a signal that can be used to adjust a flow rate or shut off one or more chemical feed pumps until the error is corrected. In some cases, the apparatus can be configured so that the adjustment or shut down occurs automatically.

In an exemplary embodiment, a desired reaction of bleach with ammonia to form monochloramine results in a temperature change, in this case, a temperature rise, of approximately one centigrade degree when the reactants are mixed at a proper ratio. If a greater temperature increase or lesser temperature increase is detected, adjustments to the flow rate of one or more of the reactants can be used to provide a more proper ratio of reactants, a more desired reaction, and a better yield of reaction product.

The method and apparatus can be used to provide safe and reliable systems for generating monochloramine solutions, for example, relatively small volumes of monochloramine solutions (5-10 lbs $NH_2Cl$/day) for water treatment or other applications.

BRIEF DESCRIPTION OF THE DRAWINGS

The present teachings will be described with reference to the accompanying drawings. The drawings are intended to illustrate, not limit, the present invention.

FIGS. 3A-3G are schematic diagrams of an example of a control scheme for controlling a small-volume generator useful in the production of monochloramine, according to an example of the present invention.

DETAILED DESCRIPTION OF THE PRESENT INVENTION

Figure 1:
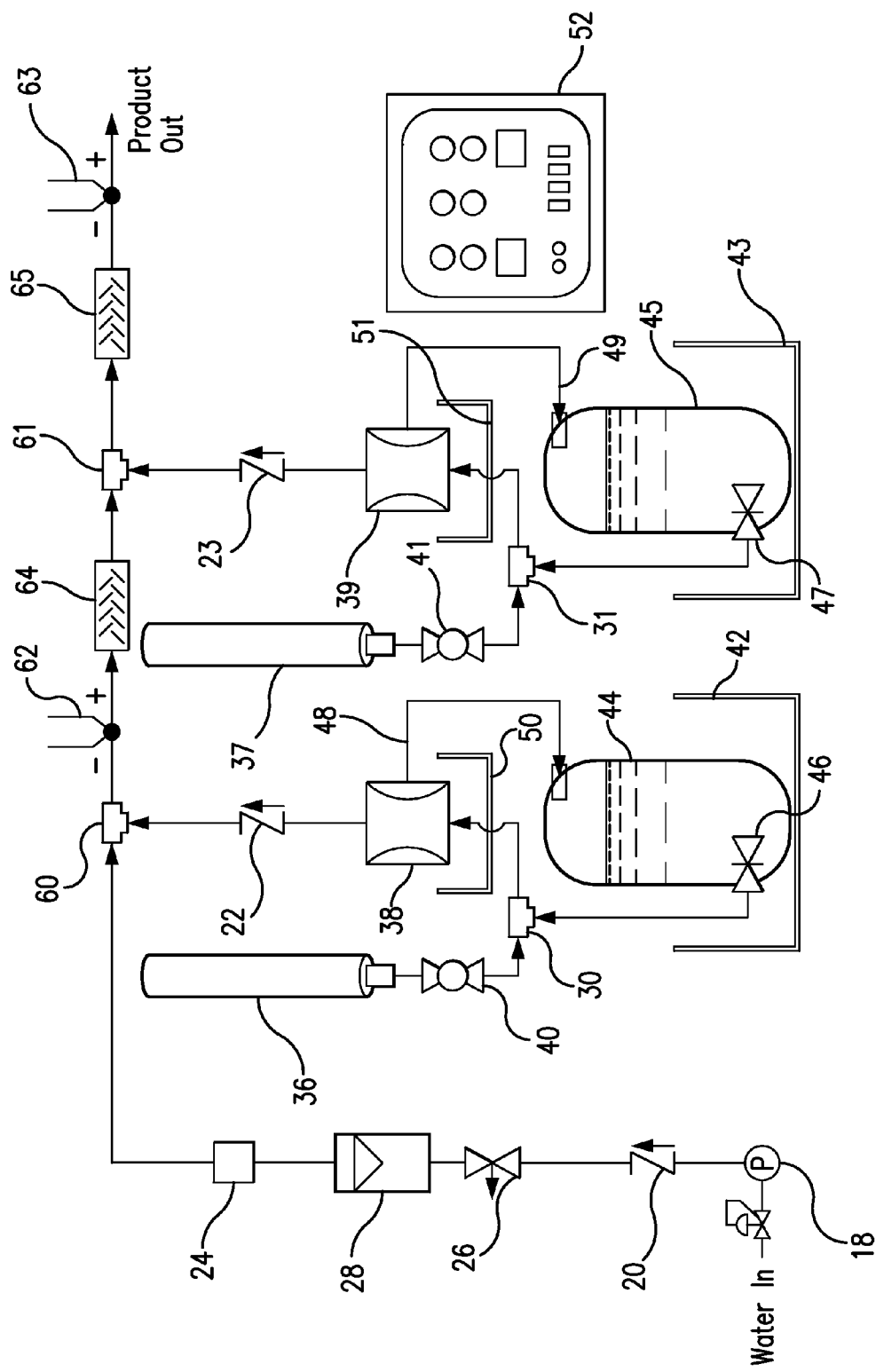
FIG. 1 is a schematic flow diagram of an example of a small-volume monochloramine generator according to the present invention.

The present invention provides a method and apparatus for mixing at least two reactants or components to form a reaction product. The method and apparatus can be useful in controlling reactions that are inherently dangerous, for example, wherein the mixing of the components has the potential to produce hazardous compounds or components. According to the present invention, precautions are taken to ensure that the molar ratio of each reactant is precisely metered, as well as incoming makeup water if used in the reaction. As an example, the method and apparatus can be used for mixing an ammonia-containing chemical (e.g., ammonia) and a hypochlorite-containing chemical (e.g., hypochlorite), the nature of which is inherently dangerous. The mixing of an ammonia-containing chemical and a hypochlorite-containing chemical must be controlled carefully to avoid the production of hazardous compounds such as dichloramine, trichloramine, and chlorine gas.

A differential temperature method of controlling an exothermic or endothermic chemical reaction is provided. The chemical reaction can be an exothermic reaction, and the temperature difference can be a temperature increase. The chemical reaction can be an endothermic reaction, and the temperature difference is a temperature decrease. The method can include measuring a temperature of a first reactant flowing at a first flow rate, contacting the first reactant with a second reactant, and then measuring the temperature of a reaction product formed by a reaction between the first and second reactants. The temperature difference between the measured temperature of the first reactant and the measured temperature of the reaction product can be used to monitor the reaction, and adjustments can be made based on the temperature difference. The flow rate of the first reactant can be adjusted based on the temperature difference. The second reactant can be made to flow at a second flow rate, and the flow rate of the first reactant and/or the second reactant can be adjusted based on the temperature difference. For purposes of the present invention, the temperature difference used in the invention can be a delta T ($\Delta T$) wherein the temperature difference can be a positive (+) difference or a negative (−) difference. For determining the $t_0$ (first temperature reading) and $t_1$ (second temperature reading), the first temperature reading can occur right before (e.g., 1 second or several seconds before) the second reactant is brought into contact (e.g., combined) with the first reactant. The first temperature reading can optionally be right at the initial time that the reactants are brought together or some other time if desired. The second reading, used to obtain the temperature differential, can be a time where maximum temperature increase or decrease occurs from the reaction (e.g., the maximum increase from the exothermic reaction or maximum decrease from the endothermic reaction, whichever the case may be). The present invention uses this temperature difference from the reaction to determine and/control the reaction to ensure that the reaction and the product from the reaction is the desired reaction product and/or to ensure that reaction is proceeding in an efficient or correct manner. In lieu of the maximum temperature difference, a time can be selected for the second temperature reading to take place, depending on the reaction. For instance, the second temperature reading can occur anywhere from about 5 seconds to about 30 minutes or more, and can depend on the speed of the reaction and reactants involved. In the case where there is a semi-continuous or continuous feed of reactants, this temperature difference can be monitored on a continuous or nearly continuous basis (e.g., meaning that delta T readings are being made/determined continuously or nearly continuously) to ensure that the reaction product being semi-continuously or continuously formed is the desired product based on determining/monitoring the temperature difference as described herein.

The contacting of the first and second reactants occurs under conditions that cause the first and second reactants to react with one another and form a reaction product. One or more additional reactants or reagents can also be a part of the reaction; and the flow rate of at least one of the additional reactants or reagents can also, or instead, be adjusted based on the temperature difference. The flow rate of a reactant or reagent can be controlled by controlling the speed of one or more metering pumps. The method can further include combining the reaction product with an aqueous source such as industrial water, process water, cooling tower water, or potable water.

The present invention is exemplified in great detail herein with reference to the reaction between ammonia, as a first reactant, and the second reactant comprises sodium hypochlorite or bleach, as the second reactant; and the reaction product obtained is monochloramine. Depending on the concentration of the reactants, one or both of them can be diluted, for example, with dilution water. Dilution can occur just prior to the reaction, or one or more of the reactants can be pre-diluted. A supply of diluent can be provided and configured to flow through the apparatus even in the event that one or both of the supplies of reactants is shut down. In the reaction to form monochloramine, the first reactant can be prepared by diluting an ammonia solution with dilution water or makeup water; and in such a case the temperature of the first reactant can be is measured at the point where the ammonia solution is contacted with the makeup water.

The apparatus of the present invention can include a reactor, a reactor system, a generator, a small-volume generator, a vessel, an in-line mixer, or the like. The apparatus can include a first conduit through which the first reactant flows, and a second conduit through which the second reactant flows. The first and second conduits can each be in fluid communication with a reactor, an in-line mixer, or the like, in which contact between the first and second reactants can occur. The first reactant can be a diluted ammonia solution or other nitrogen source, and the second reactant can be sodium hypochlorite or other hypochlorite source. The apparatus can be configured to produce any amount of monochloramine including, but not limited to, 20 pounds or more of monochloramine per day, or less than this amount. The temperature difference monitored by the method and apparatus can be compared to acceptable and unacceptable values or ranges to determine whether adjustments should be made. The target temperature difference that would indicate a proper ratio of reactants can be dependent on the reaction being carried out but can be about 10.0° C. or less, for example, a temperature difference of about 2.0° C. or less. The apparatus can be configured such that, if it is determined that the temperature difference is outside an acceptable range, an alarm can be activated indicating that the temperature difference is outside the acceptable range. The apparatus can be configured such that, if it is determined that the temperature difference is above a maximum value, a first alarm can be activated indicating that the temperature difference is above the maximum value. The apparatus can be configured such that, if it is determined that the temperature difference is below a minimum value, a second alarm can be activated, that differs from the first alarm, indicating that the temperature difference is below the minimum value.

The apparatus can be configured to measure the temperatures of the first and second reactants, determine first and second temperature differences between the measured temperatures of the first and second reactants, respectively, and the measured temperature of the reaction product. The flow rate of the first reactant and/or the second reactant can then be adjusted based on either or both of the first and second temperature differences.

An apparatus for controlling a chemical reaction can be provided. The apparatus can include a reactor, for example, a conduit, a vessel, an in-line mixer, or any combination thereof. A first conduit can be in fluid communication with the reactor and a first pump can be configured to move a first reactant through the first conduit and into the reactor. A first temperature sensor can be configured to measure the temperature of a first reactant flowing through the first conduit. A second conduit can also be in fluid communication with the reactor. A second pump can be configured to move a second reactant through the second conduit and into the reactor. A second temperature sensor can be configured to measure the temperature of a reaction product in, exiting, or after having exited, the reactor. A control unit can be configured to determine a temperature difference between a temperature measured by the first temperature sensor and a temperature measured by the second temperature sensor and can be configured to adjust the first pump, the second pump, or both, based on the temperature difference.

The apparatus can include, independently, as each of the first temperature sensor and the second temperature sensor, thermocouple sensors, platinum resistance thermometers, thermistors, or a combination thereof.

In operation, the apparatus can be in fluid communication with a source of a first reactant, for example, an ammonia solution. A first conduit can provide a fluid communication between the source and the reactor. A source of a second reactant, such as sodium hypochlorite, can be provided in fluid communication with a second conduit which, in turn, is in fluid communication with the reactor. The apparatus can further include a third pump configured to pump diluent, such as dilution water, through one or both of the first conduit and the second conduit. The control unit can be configured or programmed to maintain operation of the third pump and stop operation of the first pump, the second pump, or both, in the event of an alarm condition.

The apparatus can include one or more alarms or alarm systems. The apparatus can include an alarm configured to be activated by the control unit in the event that the control unit determines an unacceptable temperature difference. Each of the first pump, the second pump, and optionally a third pump can be a peristaltic pump.

The apparatus can include a graphical user interface configured for a user to input one or more processing parameters, for instance, one or more flow rates, pump speeds, metering quantities, temperatures, temperature differentials, temperature thresholds, or the like. As an example, the graphical user interface can be configured for a user to input (1) a first flow rate of a first reactant, (2) a second flow rate of a second reactant, and (3) acceptable ranges of temperature differentials. The temperature differentials can be differences between a temperature measured by the first temperature sensor and a temperature measured by the second temperature sensor. The control unit can be configured to control the first pump based on the inputted first flow rate and to control the second pump based on the inputted second flow rate. The control unit can be configured to control a third pump for diluent, one or more valves, one or more regulators, one or more calibration columns, one or more calibration systems, one or more shut-off valves, one or more thresholds, any combinations thereof, and the like.

The method and apparatus of the present invention can provide for the safe operation of equipment for a chemical reaction. Although a reaction between bleach and ammonia to form monochloramine is exemplified in detail herein, it is to be understood that the differential temperature measurement method and apparatus of the present invention are likewise useful in monitoring and controlling many other exothermic or endothermic chemical reactions. To exemplify the method and apparatus of the present invention, the operation of equipment for the on-site generation of monochloramine is enabled and can be achieved by precisely controlling the flow rates of dilution water, bleach, and ammonia solution so the reactants are contacted together at a proper ratio. The contact can be made merging flows of the reactants together in a conduit, by an online static mixer, within a reactor, or in a similar vessel or container. Once pump speeds, flow controls, or both, have been set, the apparatus can regulate the flows of dilution water, bleach, and ammonia to provide a desired mixture. As an option, the controls can be set properly when a 1:1 molar ratio of sodium hypochlorite to ammonia is obtained, and the feed system can precisely regulate the flows to maintain the 1:1 molar ratio. If an event occurs that alters these reaction conditions, such as an interruption in the flow of dilution water, the apparatus can be configured to automatically shut down so as to eliminate the possibility of combining the bleach and ammonia solution in a ratio that might lead to a violent, uncontrolled reaction.

For the monochloramine reaction, if the bleach-to-ammonia molar ratio exceeds 1:1, a rapid temperature increase of the reaction product, relative to the first or second reactant, can occur, for example, an increase of more than one degree centigrade or of several degrees centigrade. The apparatus of the present invention can be configured such that, when an unacceptable temperature increase is detected, the apparatus takes steps to control the reaction, activate an alarm, or both. As an option, the chemical feed pumps can be adjusted or shut down. As an option, the flow of bleach, ammonia, dilution water, or any combination thereof, can independently be increased, decreased, or shut down. As an option, an alarm circuit can be activated. A combination of these steps and alerts can be implemented, For example, the chemical feed pumps can be shut down and/or an alarm can be activated.

The apparatus can be set so that an unacceptable temperature increase can fluctuate with conditions, be dependent on reactor conditions, and/or depend on the starting temperature of one or more reactants, or depend on any combination thereof, or the like. An unacceptable temperature increase can be a temperature increase of 1.1 degrees centigrade or more, a temperature increase of 1.2 degrees centigrade or more, a temperature increase of 1.3 degrees centigrade or more, a temperature increase of 1.4 degrees centigrade or more, a temperature increase of 1.5 degrees centigrade or more, a temperature increase of 1.75 degrees centigrade or more, a temperature increase of 2.0 degrees centigrade or more, a temperature increase of 2.5 degrees centigrade or more, a temperature increase of 3.0 degrees centigrade or more, or even a higher temperature increase. Although a reaction between bleach and ammonia to form monochloramine is exemplified, it is to be understood that the differential temperature measurement method and apparatus of the present invention is likewise useful in monitoring and controlling many other exothermic chemical reactions. Other exemplary exothermic chemical reactions that can be monitored and/or controlled according to the present invention include a neutralization reaction between an acid and a base, the addition of concentrated acid to water, the reaction between lime and aluminum, an oxidation reaction of a metal, the reaction of monomers to form a polymer (a polymerization reaction), and the Haber-Bosch process of ammonia production from nitrogen gas and hydrogen gas.

Similarly, if the bleach-to-ammonia molar ratio is significantly less than 1:1 in the monochloramine reaction described herein, a temperature rise of less than one degree centigrade can be observed. The apparatus can be configured such that, when a temperature increase of less than one degree is detected, the apparatus takes steps to control the reaction, activate an alarm, or both. For example, the steps can include adjusting or shutting down the chemical feed pumps. The flow of bleach, ammonia and/or dilution water, or any combination thereof, can independently be increased, decreased, or shut down. As an option, an alarm circuit can be activated. As an option, a combination of these steps and alerts can be implemented, for example, the chemical feed pumps can be shut down and an alarm can be activated. In the event of too little of a temperature increase, an alarm circuit can be activated to alert the operator to the error that is different from the alarm circuit activated for too high or rapid a temperature increase.

As an option, a temperature increase of significantly less than one degree centigrade can be designated as unacceptable. A temperature increase of significantly less than one degree centigrade can be a temperature increase of only 0.9 degree centigrade or less, a temperature increase of only 0.8 degree centigrade or less, a temperature increase of only 0.7 degree centigrade or less, a temperature increase of only 0.6 degree centigrade or less, a temperature increase of only 0.5 degree centigrade or less, a temperature increase of only 0.25 degree centigrade or less, no temperature increase, or a temperature decrease.

It is to be understood that the differential temperature measurement method and apparatus of the present invention are likewise useful in monitoring and controlling many endothermic chemical reactions. Exemplary endothermic chemical reactions that can be monitored and/or controlled according to the present invention include decomposition reactions, formation reactions such as the formation of a cation from an atom in the gas phase, the dissolution of ammonium chloride in water, and the like. For monitoring and controlling endothermic reactions, temperature decreases that are too rapid or great, or not rapid or great enough, can trigger adjustments and alarms.

The differential temperature measurement method and apparatus can offer several advantages over alternative techniques. The temperature differential provides an instantaneous indication of an incorrect ratio of reactants, allowing corrective action to be taken before a serious hazard can develop. The measurement procedure does not require any chemical additions, such as titrants or color-development reagents that are required by many existing methods. As a result of these advantages, routine maintenance is significantly reduced. Without the moving parts of on-line titration or colorimetric equipment, the apparatus of the present invention has fewer failure modes and is consequently more reliable than existing systems.

For exothermic reactions, the method and apparatus can monitor the increase in temperature and use the temperature increase as a triggering parameter, rather than using the absolute temperature of the reaction product. Thus, the present invention involves acquiring a differential temperature measurement. In the exemplary reaction between bleach and ammonia to form monochloramine, a first temperature can be measured at the point where an ammonia solution is combined with dilution water. A second temperature measurement can be made where the bleach subsequently comes into contact with the diluted ammonia solution, or downstream thereof. The contact between these reactants, and the second measurement, can occur in, or downstream of, a static in-line mixer, or, for example, in a reactor. The difference between the first temperature and the second temperature can be determined electronically and can be used to monitor and control the reactant/chemical feed pumps.

The temperature of the second reactant, for example, the bleach in the exemplary reaction described above, can be monitored and taken into consideration when determining whether an unacceptable temperature increase or decrease has occurred. If one reactant is warmer than another reactant, the reaction product between the two reactants can be at a temperature that is between the two. The reaction product temperature can thus be cooler than the temperature of the warmer reactant. This can be the result despite the fact that an exothermic reaction has taken place. Thus, in some cases, the temperatures of two or more reactants are considered and monitored when determining acceptable limits of temperature increases or decreases to form the reaction product.

As an example of when it can be beneficial to monitor the temperature of more than one reactant, consider a reaction between an ammonia solution at 30° C. and bleach at 26° C. The resulting temperature of a mixture of the two might be expected to be about 27° C. or 28° C., in the absence of an exothermic reaction. The exothermic nature of the reaction between these reactants, however, would cause the temperature of the mixture of the two reactants, i.e., the reaction product, to rise and be somewhat higher, for example, about 29° C. As such, the reaction product (monochloramine) is at a temperature that is lower than the temperature of one of the reactants (the ammonia solution). Thus, depending on the temperatures of more than one reactant, it is possible that the reaction product temperature is less than the temperature of one of the reactants despite an exothermic reaction having taken place.

As can be seen from the foregoing, it can thus be desirable to bring the temperatures of the reactants into equilibrium, i.e., to the same temperature, before they are contacted, so that considerations as outlined above can be obviated and only two temperatures are used to determine the temperature differential.

The injection points for the ammonia solution and for the bleach can be reversed, so that the bleach is diluted first; and the initial temperature measurement is made at that point. Likewise, the bleach and ammonia solutions may be diluted separately, and the temperature rise that occurs when the two diluted solutions are combined can be measured. In an example, thermocouple sensors can be used to measure the temperatures of the solutions. It is to be understood that other electronic temperature sensors can be used as well. Platinum resistance thermometers (RTDs) or thermistors can be used, for example, if additional resolution or accuracy is desired or needed.

The method and apparatus can be used to provide safe and reliable systems for generating relatively small volumes of monochloramine solutions (5-10 lbs $NH_2Cl$/day) for water treatment or other applications. The method and apparatus can be used to produce products for industrial water treatment, cooling water treatment, influent/effluent treatment, in reverse-osmosis systems, in the treatment of process waters, in the treatment of pulp and paper materials, in the disinfection of potable water, in disinfection for food-processing applications, and generally in any industrial process that involves an endothermic or exothermic chemical reaction.

With reference to the accompanying drawings, FIG. 1 is a schematic flow diagram of an example of a small-volume monochloramine generator. Although a small-volume generator is exemplified below, large-volume or larger-volume generators can implement the methods and systems of the present invention. The same generator, or a similar generator and set-up, can be used to monitor and control other reactions, in accordance with the present invention. As shown in FIG. 1, dilution water or makeup water from a water-in source can be made to flow through a pressure regulator 18, a check valve 20, a needle valve 26, and an in-line flow meter 28 en route to a flow switch 24. These components can be used to precisely control the flow of dilution water into a tee connection 60. A source of an ammonia solution can be stored in a chemical storage tank 44 that is positioned within a secondary containment chemical tank 42. Ammonia solution from chemical storage tank 44 can exit the tank through a chemical tank valve 46 and pass through a tee connection 30 en route to a metering pump 38. Metering pump 38 can be contained within a secondary pump container 50. A pump exhaust line 48 can be provided in fluid communication with metering pump 38 and chemical storage tank 44 to complete a priming loop between chemical storage tank 44 and metering pump 38. Tee connection 30 can also be in fluid communication with a calibration column 36 through a ball valve 40. Calibration column 36 can be used to calibrate metering pump 38.

Ammonia solution can be pumped by metering pump 38 through a check valve 22 and into tee connection 60 where the ammonia solution can be contacted with and diluted by the makeup water. The temperature of the diluted ammonia solution downstream of tee connection 60 can be measured by a dual output thermocouple 62 (perfluoroalkoxy-coated) positioned immediately downstream of tee connection 60. Thermocouple 62 can be used to attain the first temperature described herein. Downstream of thermocouple 62 and tee connection 60 is an in-line static mixer 64 that is configured to thoroughly mix the ammonia solution with the dilution water.

As also shown in FIG. 1, a supply of bleach stored in a chemical storage tank 45 can be directed to merge with the diluted ammonia solution at a tee connection 61. Chemical storage tank 45 is contained within a secondary containment chemical tank 43. Bleach from inside chemical storage tank 45 can flow through a chemical tank valve 47 to a tee connection 31 and from tee connection 31 to a metering pump 39. Metering pump 39 is contained within a secondary pump container 51. A pump exhaust line 49 is provided in fluid communication with metering pump 39 and chemical storage tank 45 to complete a priming loop for metering pump 39. A calibration column 37 is provided in fluid communication with tee connection 31 through a ball valve 41, and can be used to calibrate metering pump 39 or other aspects of the generator. From metering pump 39, bleach can be directed toward and through check valve 23 to tee connection 61 where it contacts the diluted ammonia solution.

As can be seen from FIG. 1, the diluted ammonia solution and the bleach can be made to contact each other at tee connection 61 and flow downstream together toward and through an in-line static mixer 65. In-line static mixer 65 can ensure that the diluted ammonia solution and the bleach are thoroughly mixed together. Although the reaction between the diluted ammonia solution and the bleach can begin as soon as these reactants contact each other in tee connection 61, the thorough mixing by in-line static mixer 65 facilitates a homogeneous mixture of the reactants, maximizes the yield of reaction product, and ensures a more accurate downstream temperature measurement. Downstream of static in-line mixer 65, but before the reaction product is outputted from the generator, the temperature of the reaction product is measured by a dual output thermocouple 63.

The generator shown in FIG. 1 is also provided with a control unit or controller 52 that is operably connected to many components of the generator. Control unit 52 is configured to control the speed of metering pumps 38 and 39, and the various valves and regulators used to control the flow of dilution water. Controller 52 can be in electrical communication with thermocouples 62 and 63 and can be configured to receive temperature signals from thermocouples 62 and 63. Controller 52 can include a processor that can determine the difference between a temperature detected by thermocouple 63 and a temperature detected by thermocouple 62, and can use the temperature difference to maintain, adjust, or shut down the speed of metering pump 38, metering pump 39, or both. The temperatures detected by thermocouple 62 and thermocouple 63 can be used by controller 52 to determine a temperature differential and control one or more of chemical tank valves 46 and 47, check valves 20, 22, and 23, needle valve 26, in-line flow meter 28, flow switch 24, ball valves 40 and 41, and in-line static mixers 64 and 65. Operable connections can be made between controller 52 and any or all of these components. In-line flow meter 28 can be in electrical communication with controller 52 and a flow signal generated by in-line flow meter 28 can be used by controller 52 to control one or more components of the generator. The small-volume generator depicted in FIG. 1 has great flexibility and can be used for carrying out many chemical reactions besides the monochloramine reaction exemplified in detail herein.

Figure 2:
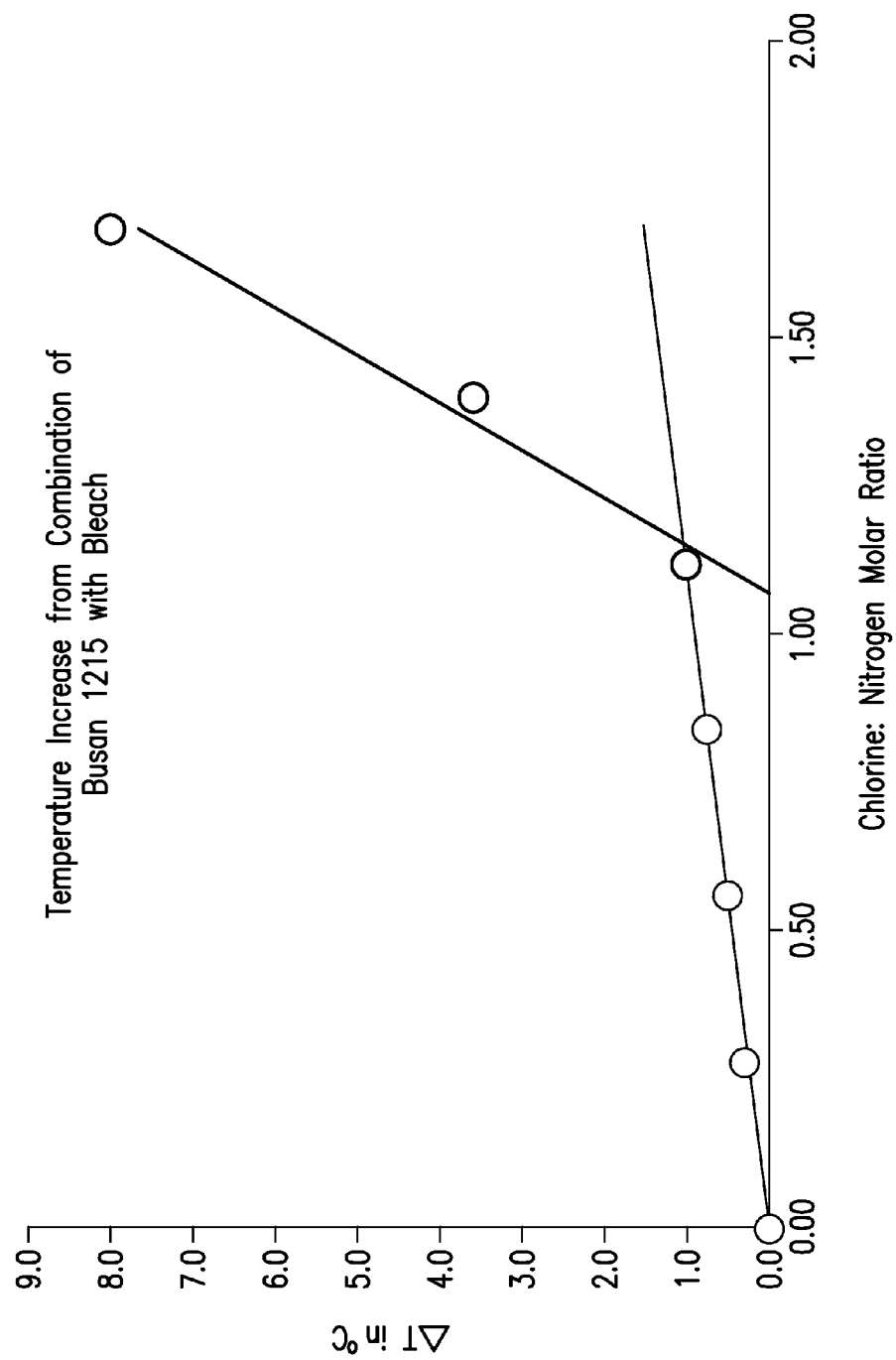
FIG. 2 is a graph demonstrating that when using a proper ratio of bleach to ammonia and thus a proper molar ratio of chlorine to nitrogen, a temperature rise of approximately one centigrade degree results, whereas, at molar ratios greater than 1:1 much more rapid temperature increases result.

FIG. 2 is a graph demonstrating that when using a proper ratio of bleach to ammonia and thus a proper molar ratio of chlorine to nitrogen a temperature rise of approximately one centigrade degree results. FIG. 2 also shows that at molar ratios greater than 1:1, much more rapid temperature increases result. Precise control over the molar ratio of the reactants can be important in controlling a desired reaction. Precise control is provided by using the method and apparatus of the present invention.

FIGS. 3A-3G are schematic diagrams of a control scheme for controlling a small-volume generator useful in the production of monochloramine, according to an example of the present invention. A three-part control scheme can be built into the controls of the apparatus. Such a control scheme can prevent a potentially dangerous situation from occurring. The three-part control scheme can include: control 1—redundant dual output temperature monitoring; control 2—makeup water flow switch; and control 3—low temperature indicators. An example of such a control scheme is shown in the electrical circuits depicted in FIGS. 3A-3G. The circuitry shown can be used in controlling the apparatus shown in FIG. 1.

Figure 3A:
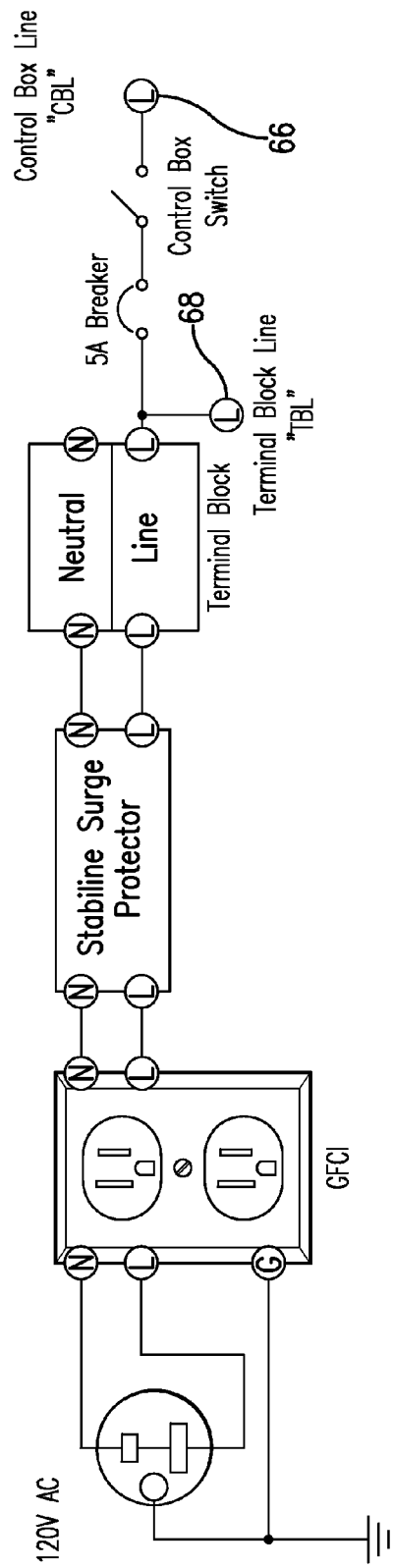
Figure 3B:
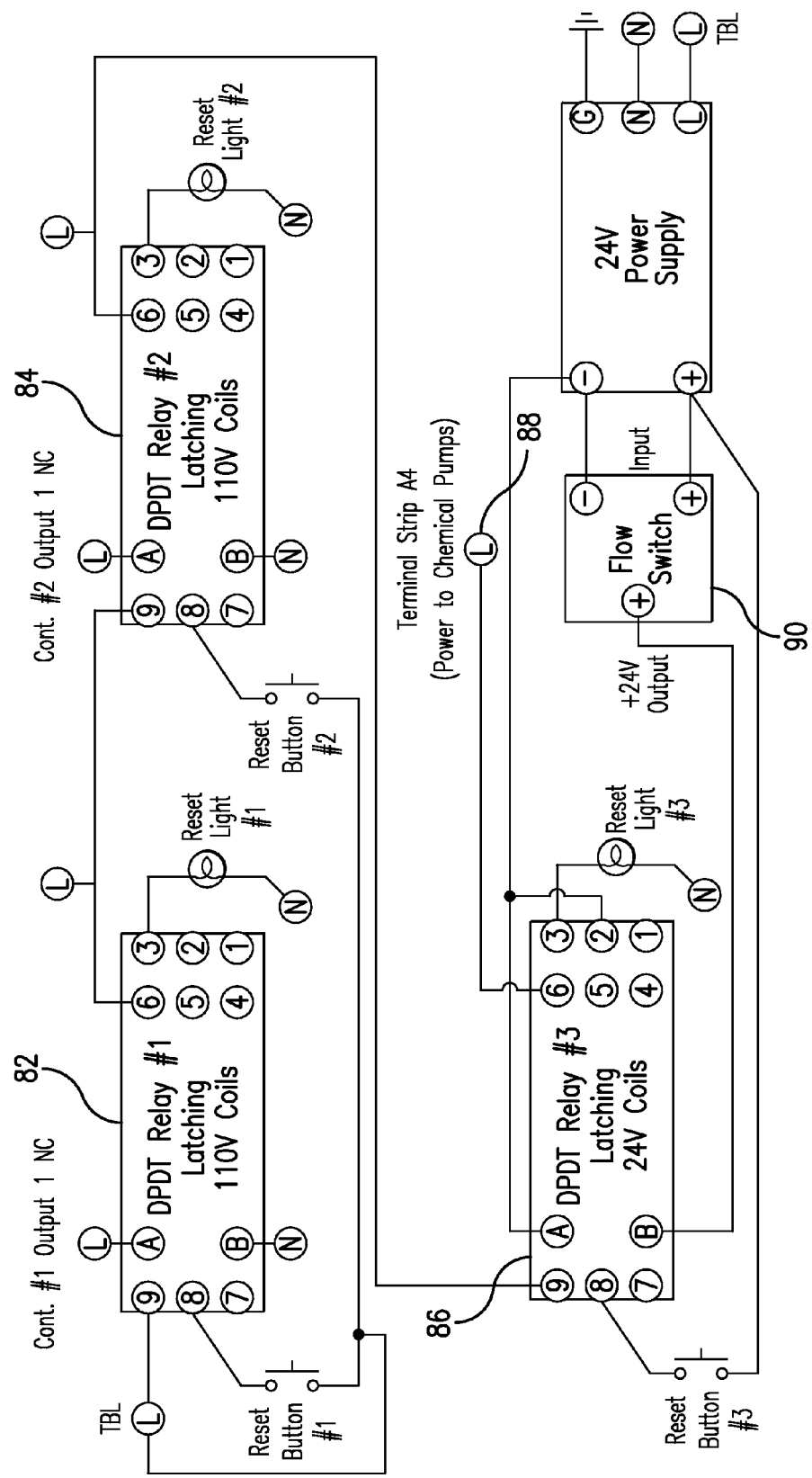
Figure 3C:
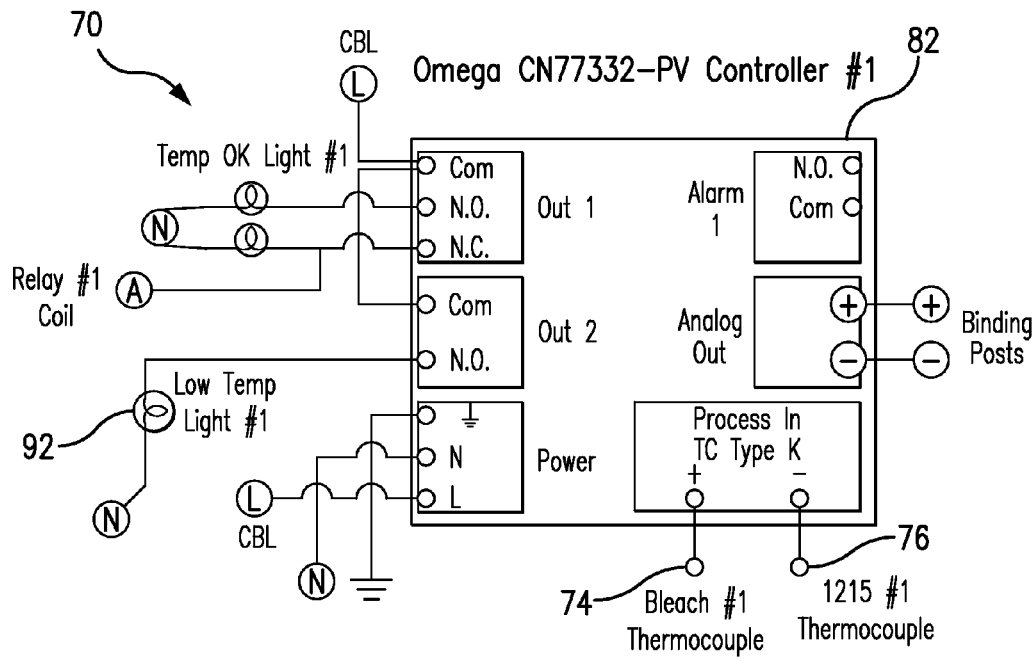

FIGS. 3A-3G are schematic diagrams of a control scheme that is useful, for example, in a small-volume generator for the production of monochloramine from bleach, an ammonia solution, and dilution (makeup) water. The first control feature of the control scheme shown in FIGS. 3A-3G involves redundant dual output temperature monitoring. FIG. 3A shows a portion of the control scheme including a circuit having a control block line 66 and a terminal block line 68 exemplary of the respective lines that are wired to the control block lines (CBL) and terminal block lines (TBL) shown in FIGS. 3B-3G. The control scheme includes two sets (70 shown in FIGS. 3C and 72 shown in FIG. 3D) of dual sensing perfluoroalkoxy (PFA) coated type K thermocouples 74, 76, 78, 80. Each thermocouple is wired in series to an Omega process controller 82, 84 (also shown in FIGS. 3C and 3D) from Omega Engineering, Inc., of Stamford, Conn. Each controller 82, 84 has independent control over the chemical feed pumps so if either controller 82, 84 determines an unsafe condition the chemical feed pumps can be shut down. As seen in FIG. 3B, controllers 82, 84 are wired to latching relays 82,84 from which power out line to latching relay 86 is wired. Latching relay 86 is controlled by the flow switch 90, which will sense a low flow condition for the dilution water. Thus, the power out line 88 for powering the chemical feed pumps (shown in FIG. 3B) is wired through latching relay 82 (controlled by the Omega process controller 82 shown in FIG. 3C), through latching relay 84 (controlled by Omega process controller 84 shown in FIG. 3D), and through latching relay 86 (controlled by the dilution water flow switch 90).

The control scheme can indicate the operating state of the chemical pumps. Whether the chemical pumps are on or off can be indicated by a chemical pumps ON light 92 and a chemical pumps OFF light 94, which are wired to the chemical pumps and to a non-latching relay 96 as shown in FIG. 3E.

The electrical outlets and circuits therefore are shown in FIGS. 3F and 3G, as are the lines and switches wired to the outlets. As shown in FIG. 3F, the pump outlet 97 for powering the ammonia solution pump, depicted as 1215 Pump Outlet, is wired to a switch 98 that in turn is wired to terminal strip A4 line 100. The pump outlet 99 for powering the bleach pump, depicted as Bleach Outlet, is wired to a switch 102 that in-turn is wired to terminal strip A4 line 104. As shown in FIG. 3G, the pump outlet 105 for powering the water pump, depicted as Water Pump Outlet, is not wired to a switch. FIG. 3G shows that the pump outlet 105, which is also for powering the bleach pump, is wired to a switch 106 that inturn is wired to terminal block line 108.

The thermocouples monitor the temperature increase or differential between two chemical feed points, and for the monochloramine reaction scheme shown, the feed points are where an ammonia solution is diluted with dilution water and where the bleach contacts the diluted ammonia solution. If the temperature increase extends beyond a user programmed set-point, the controllers 82, 84 will turn off both of the chemical feed pumps while keeping the makeup water pump on. This enables the makeup water to continue to flow and sweep away any hazardous chemical present in the reactor or reaction conduits, and in-line static mixers. An operator can manually restart the chemical pumps once it is safe for proper operation. Using this setup, if one controller 82, 84 or one thermocouple 74, 76, 78, 80 were to fail, the other controller 82, 84 would still provide proper safety should the temperature increase be indicative of unsafe process conditions.

The second control feature of the control scheme shown in FIGS. 3A-3G involves the use of a makeup water flow switch 90, as shown in FIG. 3B. Flow switch 90 can be mounted in the makeup water inlet and wired to latching relay 86. If the makeup water flow were to fall below a minimum user programmed set point, or stop flowing completely, flow switch 90 would activate latching relay 86 thereby shutting off power to the chemical feed pumps. An operator can restart the apparatus manually once it is safe for proper operation.

Figure 3D:
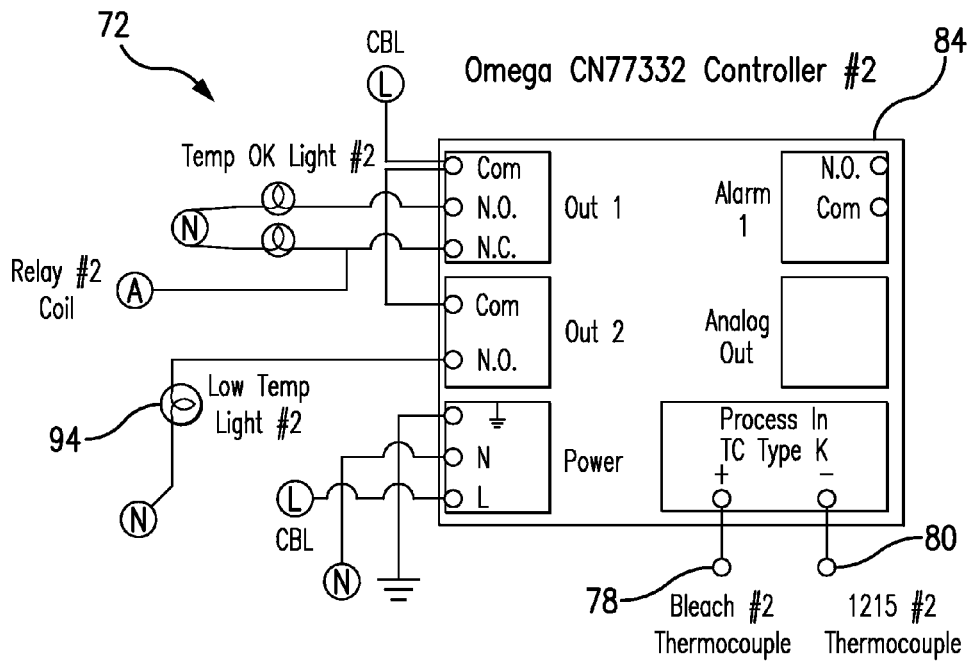

The third control feature of the control scheme shown in FIGS. 3A-3G involves the use of low temperature indicator lights 92, 94, shown in the circuits of FIGS. 3C and 3D. When the two chemical reactants are mixed in the proper molar ratio, the temperature increase between the two feed points is expected to be within certain parameters. If the differential temperature falls below these parameters, either or both low temperature indicator lights 92, 94 will turn on, thereby alerting the operator that the unit is not performing optimally. The apparatus can be configured such that low temperature indicator lights 92, 94 turn on when one of the chemical feed pumps has malfunctioned, when the makeup water flow rate is too great, or under either condition. In general, the control unit can include one or more low temperature indicator lights configured to turn on when any chemical pump is not working properly or when a makeup water flow rate exceeds a threshold level. The threshold level can be set by an operator through a graphical user interface that may be a part of the control unit.

The apparatus can further be configured such that when one or both of low temperature indicator lights 92, 94 comes on power is not disabled to the chemical feed pumps if a low temperature differential is not inherently dangerous in view of the reaction being carried out. If one of the chemical pumps were to fail or the makeup water flow were to become too great, it may be better to feed one of the reactants as a biocide or as a more diluted product mixture. The operator could still be alerted that the unit is not properly functioning but the result may be more desirable than disabling the pumps completely.

The present invention includes the following aspects/embodiments/features in any order and/or in any combination:

1. A method of controlling an exothermic or endothermic chemical reaction, comprising:
   measuring a temperature of a first reactant flowing at a first flow rate;
   subsequently contacting the first reactant with a second reactant flowing at a second flow rate, the contacting occurring under conditions that cause the first and second reactants to react with one another and form a reaction product;
   measuring the temperature of the reaction product;
   determining the temperature difference between the measured temperature of the first reactant and the measured temperature of the reaction product; and
   adjusting the flow rate of at least one of the first reactant and the second reactant if the temperature difference reaches a pre-determined temperature difference.

2. The method of any preceding or following embodiment/feature/aspect, wherein the chemical reaction is an exothermic reaction and the temperature difference is a temperature increase.

3. The method of any preceding or following embodiment/feature/aspect, wherein the chemical reaction is an endothermic reaction and the temperature difference is a temperature decrease.

4. The method of any preceding or following embodiment/feature/aspect, wherein the first reactant comprises ammonia, the second reactant comprises sodium hypochlorite, and the reaction product comprises monochloramine.

5. The method of any preceding or following embodiment/feature/aspect, further comprising preparing the first reactant by diluting an ammonia solution with dilution water, wherein the temperature of the first reactant is measured at the point where the ammonia solution is contacted with the dilution water.

6. The method of any preceding or following embodiment/feature/aspect, wherein the first reactant is flowing through a first conduit, the second reactant is flowing through a second conduit, the first and second conduits are each in fluid communication with a reactor, and the contacting occurs in the reactor.

7. The method of any preceding or following embodiment/feature/aspect, wherein the first reactant is a diluted ammonia solution, the second reactant is sodium hypochlorite, and the reactor is configured to produce no more than ten pounds of monochloramine per day.

8. The method of any preceding or following embodiment/feature/aspect, wherein the temperature difference is about 10.0° C. or less.

9. The method of any preceding or following embodiment/feature/aspect, wherein the temperature difference is about 2.0° C. or less.

10. The method of any preceding or following embodiment/feature/aspect, further comprising determining that the temperature difference is outside the acceptable range and activating an alarm indicating that the temperature difference is outside the acceptable range.

11. The method of any preceding or following embodiment/feature/aspect, further comprising determining that the temperature difference is above a maximum value and activating a first alarm indicating that the temperature difference is above the maximum value.

12. The method of any preceding or following embodiment/feature/aspect, further comprising determining that the temperature difference is below a minimum value and activating a second alarm, that differs from the first alarm, indicating that the temperature difference is below the minimum value.

13. The method of any preceding or following embodiment/feature/aspect, further comprising measuring the temperature of the second reactant, determining a second temperature difference between the measured temperature of the second reactant and the measured temperature of the reaction product, and adjusting the flow rate of at least one of the first reactant and the second reactant if the second temperature difference reaches a pre-determined temperature difference.

14. The method of any preceding or following embodiment/feature/aspect, further comprising combining the reaction product with a source of industrial water, process water, cooling tower water, or potable water.

15. An apparatus for controlling a reaction, comprising:
  a reactor;
  a first conduit in fluid communication with the reactor;
  a first pump configured to move a first reactant through the first conduit and into the reactor;
  a first temperature sensor configured to measure the temperature of a first reactant flowing through the first conduit;
  a second conduit in fluid communication with the reactor;
  a second pump configured to move a second reactant through the second conduit and into the reactor;
  a second temperature sensor configured to measure the temperature of a reaction product in the reactor; and
  a control unit configured to determine a temperature difference between a temperature measured by the first temperature sensor and a temperature measured by the second temperature sensor and configured to adjust the first pump, the second pump, or both, based on the temperature difference.

16. The apparatus of any preceding or following embodiment/feature/aspect, wherein the reactor comprises a conduit, a vessel, an in-line mixer, or a combination thereof.

17. The apparatus of any preceding or following embodiment/feature/aspect, wherein each of the first temperature sensor and the second temperature sensor independently comprises a thermocouple sensor, a platinum resistance thermometer, a thermistor, or a combination thereof.

18. The apparatus of any preceding or following embodiment/feature/aspect, further comprising a source of an ammonia solution in fluid communication with the first conduit, and a source of sodium hypochlorite in fluid communication with the second conduit.

19. The apparatus of any preceding or following embodiment/feature/aspect, further comprising an alarm configured to be activated by the control unit in the event that the control unit determines an unacceptable temperature difference.

20. The apparatus of any preceding or following embodiment/feature/aspect, further comprising a third pump configured to pump dilution water through one or both of the first conduit and the second conduit, wherein the control unit is configured to maintain operation of the third pump and stop operation of the first pump, the second pump, or both, in the event of an alarm condition.

21. The apparatus of any preceding or following embodiment/feature/aspect, wherein each of the first pump and the second pump comprises a peristaltic metering pump.

22. The apparatus of any preceding or following embodiment/feature/aspect, wherein the control unit further comprises a redundant dual output temperature monitoring circuit.

23. The apparatus of any preceding or following embodiment/feature/aspect, wherein the control unit further comprises makeup water flow switch configured to be activated if a flow of makeup water falls below a minimum user programmed set point, and shut off power to the first and second pumps.

24. The apparatus of any preceding or following embodiment/feature/aspect, wherein the flow switch is wired to a latching relay and the control unit is configured such that activation of the flow switch comprises activating the latching relay to shut off power to the first and second pumps.

25. The apparatus of any preceding or following embodiment/feature/aspect, wherein the control unit further comprises one or more low temperature indicator light(s) configured to turn on when either the first pump or the second pump is not working properly or when a makeup water flow rate exceeds a threshold level.

26. The apparatus of any preceding or following embodiment/feature/aspect, further comprising a graphical user interface configured for a user to input (1) a first flow rate of a first reactant, (2) a second flow rate of a second reactant, and (3) an acceptable range of temperature differences between a temperature measured by the first temperature sensor and a temperature measured by the second temperature sensor, wherein the control unit is configured to control the first pump based on the inputted first flow rate and to control the second pump based on the inputted second flow rate.

It is apparent that variations and modifications to the present teachings are possible without departing from its scope and spirit. It is therefore to be understood that the appended claims are to be construed as encompassing all features of patentable novelty that reside in the present teachings, including all features that would be treated as equivalent thereof by those skilled in the art to which the present teachings pertain. All U.S., International, and foreign patents and publications, as well as non-patent literature, referred to herein are hereby incorporated herein by reference in their entireties. All publications, patents, and patent applications mentioned in this specification are herein incorporated by reference to the same extent as if each individual publication, patent, or patent application was specifically and individually indicated to be incorporated by reference.

While embodiments of the present teachings have been shown and described herein, it will be apparent to those skilled in the art that such embodiments are provided by way of example only. Numerous variations, changes, and substitutions will now occur to those skilled in the art without departing from the present teachings. It is to be understood that various alternatives to the embodiments of the disclosure described herein may be used in practicing the present teachings. It is intended that the following claims define the scope of the present teachings and that methods and structures within the scope of these claims and their equivalents be covered thereby.

What is claimed is:

1. A method of controlling an exothermic chemical reaction, comprising:
    measuring a temperature of a first reactant flowing at a first flow rate;
    subsequently contacting the first reactant with a second reactant flowing at a second flow rate, the contacting occurring under conditions that cause the first and second reactants to react with one another in an exothermic chemical reaction and form a reaction product in a reactor, wherein the reactor is an in-line mixer, the first reactant comprises ammonia, the second reactant comprises sodium hypochlorite, and the reaction product comprises monochloramine, wherein one or both of the first and second reactants are diluted with dilution water;
    measuring the temperature of the reaction product;
    determining the temperature difference between the measured temperature of the first reactant and the measured temperature of the reaction product;
    adjusting the flow rate of at least one of the first reactant and the second reactant if the temperature difference reaches a pre-determined temperature difference; and
    combining the reaction product with a source of industrial water, process water, cooling tower water, or potable water.

2. The method of claim 1, further comprising preparing the first reactant by diluting an ammonia solution with dilution water, wherein the temperature of the first reactant is measured at the point where the ammonia solution is contacted with the dilution water.

3. The method of claim 1, wherein the first reactant is flowing through a first conduit, the second reactant is flowing through a second conduit, the first and second conduits are each in fluid communication with a reactor, and the contacting occurs in the reactor.

4. The method of claim 3, wherein the first reactant is a diluted ammonia solution, the second reactant is sodium hypochlorite, and the reactor is configured to produce no more than ten pounds of monochloramine per day.

5. The method of claim 1, wherein the temperature difference is about 10.0° C. or less.

6. The method of claim 1, wherein the temperature difference is about 2.0° C. or less.

7. The method of claim 1, further comprising determining that the temperature difference is outside acceptable range and activating an alarm indicating that the temperature difference is outside the acceptable range.

8. The method of claim 1, further comprising determining that the temperature difference is above a maximum value and activating a first alarm indicating that the temperature difference is above the maximum value.

9. The method of claim 8, further comprising determining that the temperature difference is below a minimum value and activating a second alarm, that differs from the first alarm, indicating that the temperature difference is below the minimum value.

10. The method of claim 1, further comprising measuring the temperature of the second reactant, determining a second temperature difference between the measured temperature of the second reactant and the measured temperature of the reaction product, and adjusting the flow rate of at least one of the first reactant and the second reactant if the second temperature difference reaches a pre-determined temperature difference.

11. The method of claim 1, the in-line mixer is an in-line static mixer.

* * * * *